Oct. 27, 1953  W. A. JAVERY  2,656,580
SLIDING SNAP HOOK
Filed Nov. 30, 1951
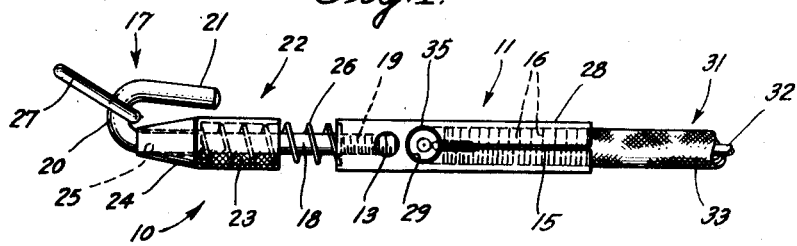
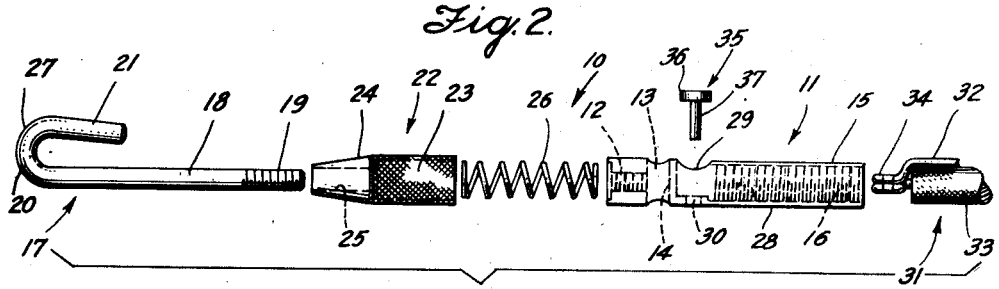
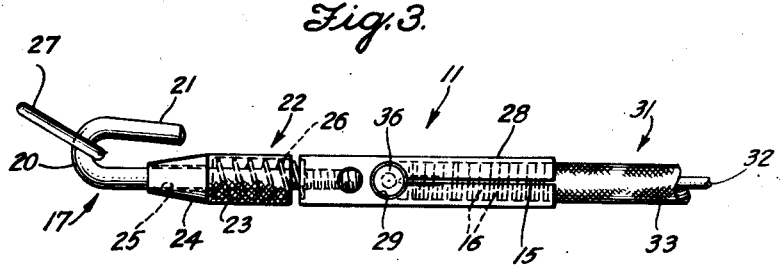
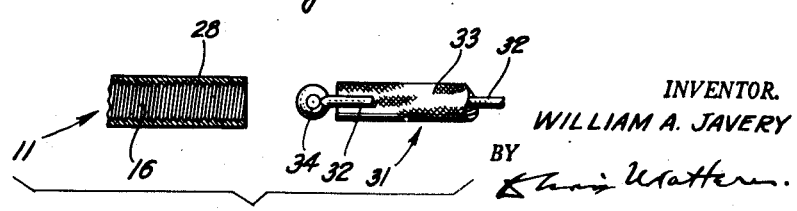
INVENTOR.
WILLIAM A. JAVERY
BY
ATTORNEY

Patented Oct. 27, 1953

2,656,580

UNITED STATES PATENT OFFICE 2,656,580

SLIDING SNAP HOOK

William A. Javery, Torrington, Conn., assignor to
Edwin W. Plumb, Morris, Conn.

Application November 30, 1951, Serial No. 259,116

3 Claims. (Cl. 24—239)

This invention relates to new and useful improvements in clips and has particular relation to a safe clip adapted for use in detachably attaching the hand harness of a press operator to a pull-out type of press guard.

An object of the invention is to provide a clip especially adapted for the purpose indicated and which is easily opened and attached to a loop of a hand harness and which is self-closing and cannot be casually or accidentally disconnected from such loop to the end that once attached the hand harness will be pulled by the press pull-out guard and damage to an operator's hands thereby avoided.

Another object is to provide a clip for the purpose stated and including improved means for attaching it to the length of rope, a bell rope, to be used for pulling or jerking the clip and thus the hands of the operator to a safe position.

A further object is to provide a simple, safe and easily operated clip for the purpose set forth and which clip includes improved means for permanent attachment of the clip to a pull-out rope.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 1 is a side elevational view showing the clip of the invention closed on a loop of a hand harness or the like and having the pull-out rope attached thereto;

Fig. 2 is an exploded view showing in side elevation the elements of my improved clip;

Fig. 3 is a view similar to Fig. 1 but with the clip open ready for detachment from a loop; and Fig. 4 is a detail sectional view showing the interior of the cord attaching end of the clip and the cord end portion to be attached.

Referring in detail to the drawing, at 10 is generally indicated my improved clip and the same comprises an elongated generally cylindrical body generally designated 11 and which is substantially solid at its inner end. At such end the body is provided with a threaded longitudinally extending opening 12 and a transverse opening 13 into a side of which the opening 12 enters. The opposite side of said transverse opening 13 is defined by a wall portion 14. The outer end of body 11 is hollow and is longitudinally split through one side, as at 15, and is internally roughened as by the formation of screw threads 16 therein.

A member 17 is shown as formed up of a piece of transversely round stock and such member includes an elongated shank 18 having its one end threaded at 19. The other end portion of said shank is provided with a return bend 20 and has a portion extending back along the side of but spaced from the shank and either parallel therewith or inclined slightly inwardly toward the shank and with the adjacent portion of the latter constituting a hook 21.

In addition, my clip includes a slide 22 comprising a hollow body portion 23 externally knurled or otherwise roughened for gripping and forwardly of said hollow body portion 23 is a tapered portion 24 having an opening 25 extending longitudinally therethrough. This slide is located on the shank 18 of member 17 and then interposed between the slide and the inner end of body 11 is a coil spring 26. This spring bears at its outer end against the inner end of body 11 and the spring is located about the shank 18 and has its inner end received in the hollow cylindrical portion 23 of slide 22. The extreme inner end of the spring bears against the wall at the forward end of said hollow portion 23 and located radially about the outer end of the opening 25 through the slide portion 24.

In making the assembly of the parts described, the slide 22 is slipped over the threaded end portion 19 of shank 18 and then the spring 26 is located about the shank and thereafter the threaded end of the shank is threaded into the tapped opening 12 in the inner end of the body. The shank and body may be threaded together until the free end of the threaded portion of the shank engages the wall 14 of the body. Now, if desired, suitable tools may be utilized, being employed through the transverse opening 13 of the body, to distort the threads at the inner end portion of the shank or to distort such shank portion itself whereby the shank and body are permanently attached to one another.

At this time, the spring 26 will be expanded and urging the slide 22 into the forward portion in which it is shown in Fig. 1 where it will be noted that the cylindrical body portion 23 of the slide is opposite the free end portion of the hook 21 so that there is very little space between such hook portion and the slide. If desired, the slide may be of greater diameter than shown or the hook portion may be bent slightly more inwardly toward the shank whereby the free end portion of the hook and body of the slide will be in a closer relation than that illustrated in Fig. 1.

As has been suggested, the clip of the invention is adapted for use in attaching the pull-out cords of a press guard to the hand harness of a press operator. In Figs. 1 and 3, a loop 27 which may be attached to a hand harness is shown as received in the hook 21 of the present clip. In Fig. 1, slide 22 is in its forward position and thus the present clip may not be detached from the loop 27.

When the present clip is to be detached from the loop 27, the operator may grasp the knurled or roughened portion 23 of the slide and retract it as to the position of Fig. 3, compressing the spring 26. Because of the presence of the spring 26, the slide will not casually move back to the retracted position and therefore the clip will not be accidentally released from the clip 27. To release the clip from the loop, the slide must be manually retracted against the tendency of spring 26.

With the slide in the retracted position of Fig. 3, it is noted that the forward or inner tapered portion 24 of the slide is opposite the free end portion of the hook 21 and thus the space between the slide and such hook portion is of considerable width and of such width to permit of the passage of an arm of the loop 27 whereby the present clip may be detached from the loop.

The outer slitted tubular end portion of body 11, which for the purpose of further description is designated 28, is inwardly of its internally roughened or threaded portion provided with a large diameter opening 29 with which the inner end of the slot 15 communicates. Diametrically opposite said opening 29 is a smaller diameter opening 30.

These clips are equipped with a pull-out rope 31 comprising a length of bell cord including a metal core 32 and a braided fibrous covering 33. For the present purpose, the covering is stripped off an end portion of the core and such end portion is looped upon itself to provide an eye 34. At this time, the cylindrical portion 28 may be open along its slot 15 and the cord is entered into such portion to bring the eye 34 into alignment with the holes 29 and 30. Thereupon, a rivet 35 is dropped through said holes and the eye, the head 36 of the rivet entering through the large hole 29 and the shank 37 of the rivet passing through the small hole 30. Now, the rivet is headed at the outer side of the hole 30 and against the wall portions about said holes.

In addition, the split tubular portion of the body is drawn in whereby the split 15 therethrough has its edges closely related as in Figs. 1 and 3. Thus, the core 32 of the pull-out rope 31 is anchored by the rivet 35 and the covering 33 of the rope, which represents a very substantial portion of the tensile strength of the rope, is gripped by the interiorly roughened walls of said tubular portion 28. Thus, the pull-out rope is permanently and securely attached to the clip.

Having thus set forth the nature of my invention, what I claim is:

1. In a clip for the purpose described, an elongated body, comprising a hollow outer end portion roughened on its inner surface and having a transverse opening therethrough toward its inner end, a pull rope comprising a metal core and a fibrous coating, said rope having an end in said hollow body portion with the latter clampingly engaging said fibrous coating with its interiorly roughened surface, said core at the inner end of said coating bent into an eye, and a rivet passing transversely through said opening through said body and through said eye.

2. In a clip, an elongated body member, a hook member comprising an elongated straight shank secured at one end to said body member and having at its other end a return bend consisting of a bight portion and a hook portion in spaced transversely opposed relation to the straight portion of said shank adjacent said bight portion, the free end of said hook portion being at a point intermediate said bight portion and the forward end of said body member, a slide on said shank having a straight passage slidably receiving said shank and comprising a rearward part having an external cylindrical surface at a less radial distance from said shank than said hook portion and a forward part having an external surface conically tapered forwardly from the forward end of said cylindrical surface and of a length substantially less than the length of said hook portion, a spring on said shank between said body and said slide and normally urging the slide forwardly along the shank to a forward position limited by abutment of its forward end with said bight portion, and wherein the cylindrical rearward part of the slide is transversely opposed to said free end of said hook portion and said tapered forward part is entirely forwardly of said free end of said hook portion, and said slide being retractable against the force of said spring to locate said tapered part in transversely opposed relation to said free end of said hook portion.

3. The invention as defined in claim 2, further characterized in that said hook portion is at a rearwardly and inwardly inclined angle to said shank, whereby in the forward position of said slide said hook forms with said tapered part of said slide a rearwardly convergent passage, the longitudinal center line of which is substantially parallel to said shank.

WILLIAM A. JAVERY.

References Cited in the file of this patent

UNITED STATES PATENTS

| Number | Name | Date |
|---|---|---|
| 558,822 | Linkenbach | Apr. 21, 1896 |
| 833,808 | True | Oct. 23, 1906 |
| 2,157,288 | Gauss | May 9, 1939 |
| 2,415,583 | Eddy | Feb. 1, 1947 |

FOREIGN PATENTS

| Number | Country | Date |
|---|---|---|
| 452,888 | France | Mar. 20, 1913 |